(No Model.)
N. H. ROBERTS.
ROTARY PLOW.
No. 530,964. Patented Dec. 18, 1894.
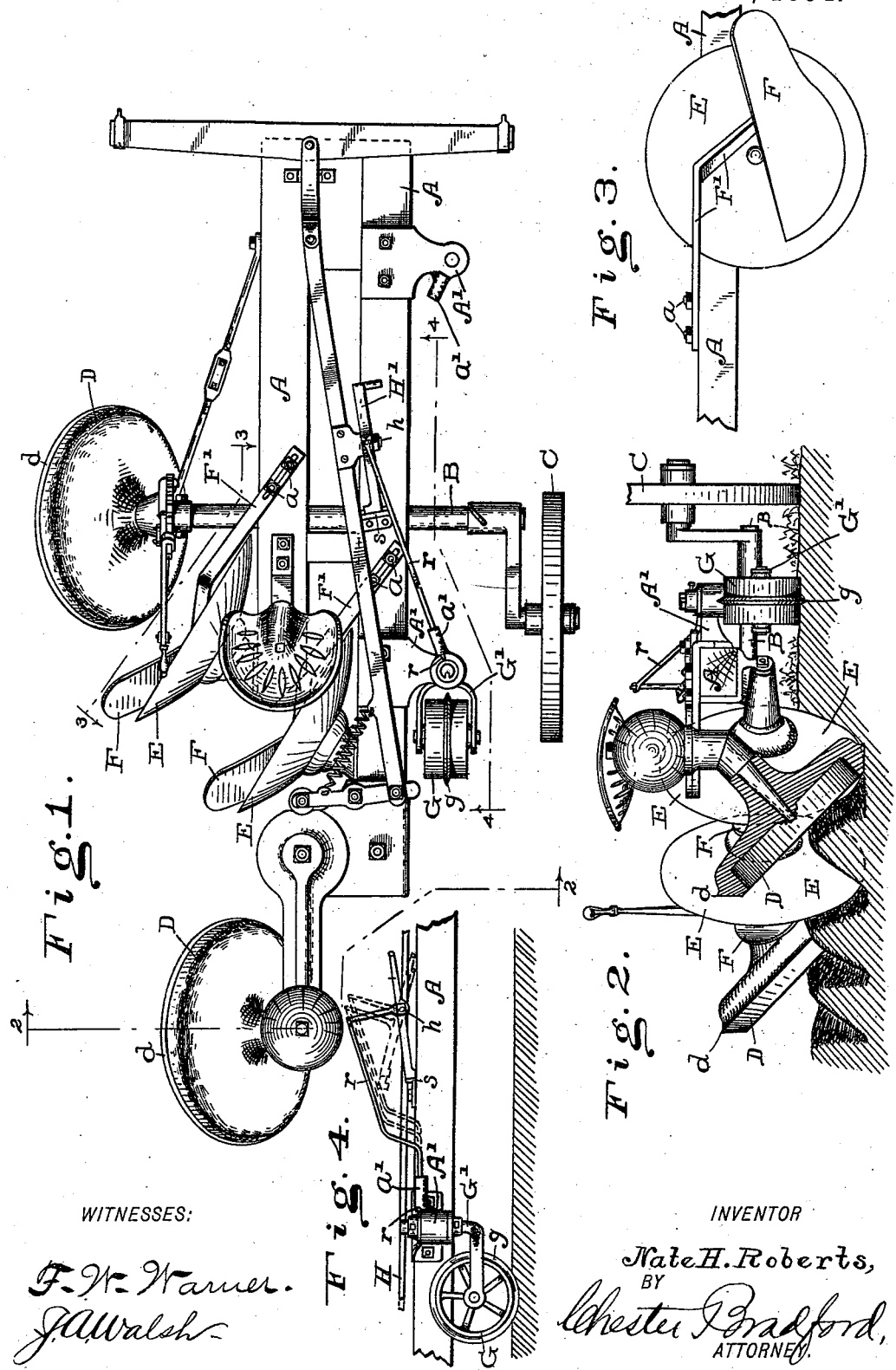
WITNESSES:
F. W. Warner.
J. A. Walsh.
INVENTOR
Nate H. Roberts,
BY
Chester Bradford,
ATTORNEY.

UNITED STATES PATENT OFFICE.

NATE H. ROBERTS, OF INDIANAPOLIS, INDIANA, ASSIGNOR TO ELIAS C. ATKINS, OF SAME PLACE.

ROTARY PLOW.

SPECIFICATION forming part of Letters Patent No. 530,964, dated December 18, 1894.

Application filed February 12, 1894. Serial No. 499,923. (No model.)

*To all whom it may concern:*

Be it known that I, NATE H. ROBERTS, a citizen of the United States, residing at Indianapolis, in the county of Marion and State of Indiana, have invented certain new and useful Improvements in Rotary Plows, of which the following is a specification.

The object of my said invention is to improve in some details of construction that variety of rotary plows, such as are shown and described, for instance, in Letters Patent of the United States, No. 496,119, dated April 25, 1893. A plow embodying my said inventions or improvements will be first fully described, and the novel features thereof then pointed out in the claims.

Referring to the accompanying drawings, which are made a part hereof, and on which similar letters of reference indicate similar parts, Figure 1 is a top or plan view of a plow embodying my said improvements; Fig. 2, a rear elevation, except that the hind guide-wheel is shown in section, as seen from the dotted line 2 2 in Fig 1; Fig. 3, a face view of the plowing disk, as seen from the dotted line 3 3 in Fig. 1; and Fig. 4, a detail elevation, as seen from the dotted line 4 4.

In said drawings the portions marked A represent the main frame-work; B, the axle; C, the land-wheel; D, the staggered guide-wheels; E, the plowing disks; F, the mold boards; G, the supplemental land-wheel, and H the draft-bar.

The frame A and axle B and land-wheel C are the same as shown in the Letters Patent above referred to. The staggered guide-wheels D are also the same in position and arrangement, but are different in construction. I have found by experiment that it is highly desirable especially in loose soils that there should be a broad bearing surface on said guide-wheels, to rest on the bottoms of the furrows, and that there should also be a sharp edge $d$ to engage with the bank at the bottom left by the plowing disk in advance. I have, therefore, remodeled these wheels in accordance with these requirements, and, as shown most plainly in Fig. 2, have given it a flat bearing surface, which rests on the bottom of the furrow; and on the side have given it such a curve as enables it to engage with the bank, and thus avoid any danger of its riding out of the furrow.

The plowing disks E are or may be the same in construction and arrangement as those of the patent above mentioned. In connection with said disks I have shown mold-boards F, which are provided for the purpose of throwing the earth over more perfectly in plowing sodded ground, and thus burying the sod more completely. The plowing disks, with this arrangement, do all of the cutting and much of the turning. The front edges of the mold-boards are behind and protected by the front edges of the cutting disks. They are so positioned that but little extra power is required for their employment, while they turn the sod under perfectly and completely. These mold-boards are mounted upon bars F', which are preferably slotted, and thus adjustable upon the bolts $a$, by which they are secured to the frame A. Such mold-boards are not, however, claimed herein.

The supplemental, land-wheels G are a new feature, and are provided for the purpose of helping to sustain the heavy structure of this plow, particularly in soft or wet lands, and are broad on the surface for that reason. In such lands, too, especially where mold-boards F are used, additional means for preventing sidewise motion are desirable, and for this purpose I provide a sharp ridge $g$, which will cut into the ground somewhat and prevent slipping. In turning, it is necessary that this wheel should swivel, and so I have mounted it in a swivel-housing G', which in turn is mounted in a bearing in a bracket A' on the frame A. It is sometimes desirable to have this wheel located near the front instead of near the rear end of the frame, as shown, and I therefore provide an extra bracket A', near the front end, to which the wheel and housing can be removed and readily attached without difficulty. Ordinarily in the movement of the plow, it is desirable that this caster wheel should remain rigid, notwithstanding it is necessary for it to swivel in turning. A latch rod $r$ is therefore provided, and said rod runs to the catch lever H', by which it may be operated, as will be presently more fully described. As shown in Fig. 2, the distance between the levels at which the wheels D and G rest on the ground, is equal to the depth at which the plows are to run.

The draft-bar H is substantially the same as in the Letters Patent above referred to, and operates generally in the same manner. Upon it, however, is a stud-shaft $h$, and upon this a catch lever H' is mounted, the rear end of which is adapted to engage with a stop $s$ on the frame A. These parts are so positioned and arranged that when the plow is in regular work, and the parts under draft, the lever H' will drop down behind the stop $s$, holding the draft-bar rigidly in position, and the parts operated thereby into engagement. When, however, it is desirable to turn the plow, the operator places his foot upon the front end of this lever H', throwing its rear end up out of engagement with the stop $s$, and at the same time disengaging the latch rod $r$ which passes through a socket $a'$ on the bracket A' from engagement with the housing G'. The draft upon the draft-bar H being at the same time slackened somewhat, both the rear staggered guide-wheel and the supplemental land-wheel are permitted to swivel at the same time, as will be readily understood.

Having thus fully described my said invention, what I claim as new, and desire to secure by Letters Patent, is—

1. The combination, in a rotary plow, with the frame-work, plowing disks, and draft-bars, of the axle having an angularly set spindle at one end and a guide-wheel mounted thereon, said guide-wheel having a flat bearing surface resting on the bottom of the furrow, and a curve upon the side, the flat and curved sides, where they come together, terminating in a sharp edge, substantially as shown and described.

2. The combination, in a rotary plow, of the staggered guide-wheel mounted on a swinging arm, a lever engaging therewith, a draft-bar running forward to the double-tree and attached to said lever, a pivoted lever mounted on said draft-bar, and a stop on the frame-work with which said lever will engage, substantially as shown and described.

3. The combination, in a rotary plow, of the frame-work A, axle B therefor, land wheel C, furrow wheel D, rotary plowing disks E mounted on arms secured to said frame-work, a small caster wheel G mounted in the housing G', said housing being mounted in a bracket A' secured to and projecting laterally from said frame-work, said housing also having an engaging catch, a latch rod $r$ engaging therewith at one end, and a foot lever mounted upon the frame-work for operating said latch rod, substantially as shown and described.

In witness whereof I have hereunto set my hand and seal, at Indianapolis, Indiana, this 29th day of December, A. D. 1893.

NATE H. ROBERTS. [L. S.]

Witnesses:
CHESTER BRADFORD,
JAMES A. WALSH.